J. J. RIDER.
Wheel Cultivator.
No. 45,177.
2 Sheets—Sheet 1.
Patented Nov. 22, 1864.
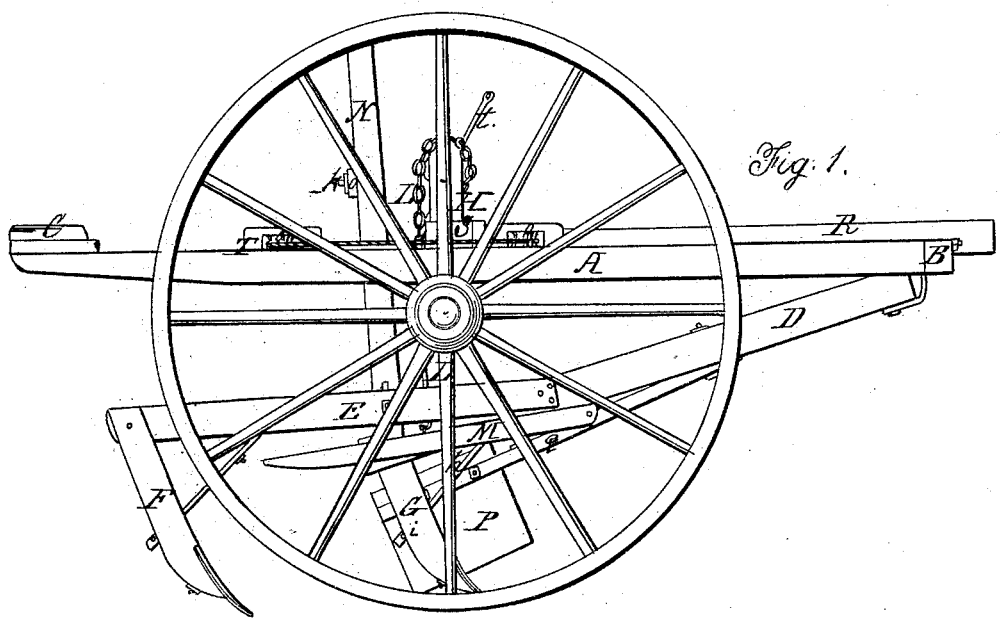
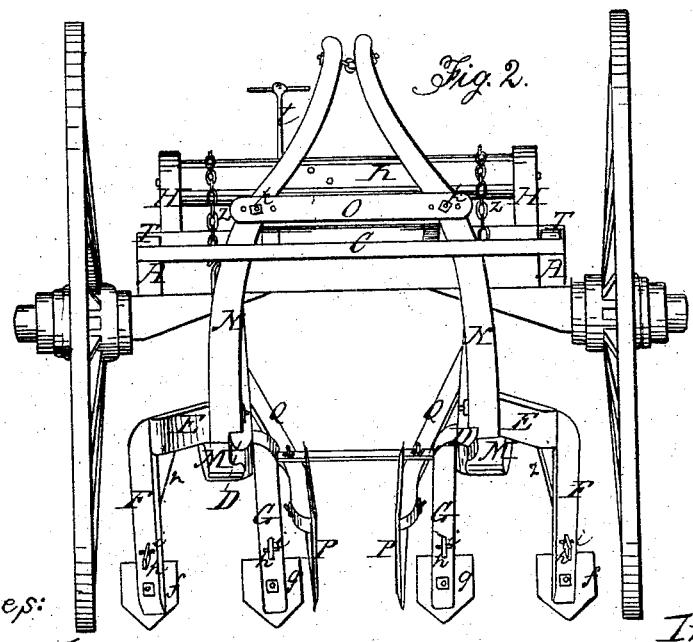

J. J. RIDER.
Wheel Cultivator.

No. 45,177.

2 Sheets—Sheet 2.

Patented Nov. 22, 1864.

UNITED STATES PATENT OFFICE.

J. J. RIDER, OF WILTON JUNCTION, IOWA.

IMPROVEMENT IN CULTIVATORS.

Specification forming part of Letters Patent No. 45,177, dated November 22, 1864.

*To all whom it may concern:*

Be it known that I, J. J. RIDER, of Wilton Junction, in the county of Muscatine and State of Iowa, have invented certain new and useful Improvements in Corn-Cultivators; and I do hereby declare that the following is a full, clear, and exact description thereof, reference being had to the accompanying drawings, forming a part of this specification, in which—

Figure 3:
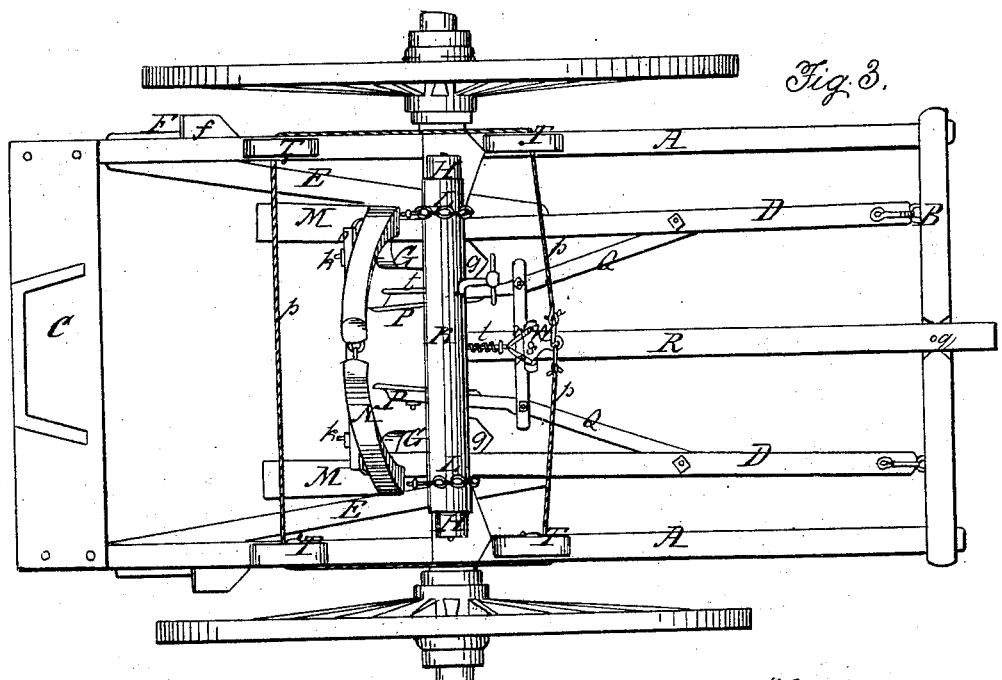
Figure 4:
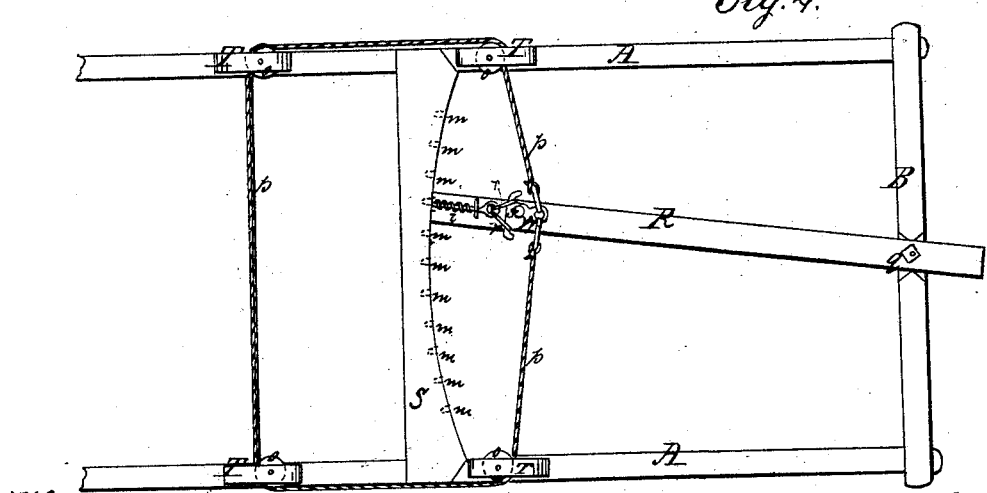

Figure 1 is a side elevation of a cultivator made after my improved plan; Fig. 2, a rear elevation of the same; Fig. 3, a top or plan view thereof; and Fig. 4, a detached plan view of a portion of the main frame and draft-pole of the cultivator, designed to illustrate more clearly my improved mode of adjusting the direction of the draft-pole.

Similar letters of reference, where they occur, indicate corresponding parts in the several drawings.

My improvements relate, first, to the manner of hanging the plow-beams; second, to the means employed for regulating the depth of the furrows formed by the plowshares and for elevating the plows when passing over obstructions or turning the machine; and, third, to a peculiar manner of adjusting the draft-pole in order to facilitate the operation of the cultivator when working upon hillsides.

The frame of the cultivator to which I have applied my improvements is composed of two suitable stout side timbers, A, connected at their forward ends by the transverse beam B, to which the side beams may be mortised or otherwise suitably secured, and at their rear ends by the cross-piece C, extending between the rear ends of the side timbers, and so fashioned as to form a seat for the driver. The frame is completed by a third cross-piece, S, about half-way between the ends and over the axle and between the wheels, on which the frame is secured, as clearly shown in the drawings.

The plow-beams D D are hinged to the lower edge of the transverse frame-beam B by means of the clevises and bolts, as shown in Figs. 1 and 3, or other equivalent device, so as to form universal joints at their points of attachment. These plow-beams D D extend toward the rear of the machine and support the secondary plow-beams E E, which are secured to their outer faces at a point somewhat in front of the axis of the wheels of the machine, so as to diverge outwardly therefrom.

The share-beams F F and G G, which carry the plowshares $f\ f$ and $g\ g$, are secured respectively to the rear ends of the plow-beams D D and E E, each by a single pin; but in order to give the requisite stability to the attachment I use brace-rods $h\ h$, of metal, extending diagonally from the plow-beams through slots cut in the share-beams F F and G G. The rear ends of these brace-rods, which project through the slotted share-beams, are squared off and pierced with holes for the reception of wooden pins $i\ i$, to be inserted therein, these pins being of such a size as to hold and support the share-beams under all ordinary strain thereon, but which will yield and break should the plowshares come in contact with any unusual impediment. By this device the breaking or serious straining of any vital part of the machine is prevented. By piercing the brace-rods $h\ h$ each with several holes the plows may be at pleasure adjusted to any required pitch.

The rear ends of the plow-beams D D are combined with each other by means of two curved uprights, N N, whose lower ends are secured upon the outer sides of the main plow-beams in the angle formed by the junction therewith of the divergent beams E E, or they may be secured to the inner side of said secondary beams E E, near the end of the main plow-beams, as shown in Figs. 2 and 3 of the drawings. These uprights extend upwardly with an inward curve until their upper ends meet, so as to form an elliptical arch, and they are so hinged together as to allow the plow-beams to swing together or asunder, as may be required. This movement of the plow-beams is controlled and the interval between them adjusted and fixed at pleasure by means of a cross-bar or gage-brace, O, whose ends are secured to the curved uprights by means of suitable transverse bolts or pins, $k\ k$, which pass through apertures formed in said uprights and through such of a series of holes in the ends of the bar as are brought into register therewith. The attachment of the lower ends of the connecting curved uprights to the plow-beams should be so made as to accommodate itself to their varying inclination as the interval between the beams is increased or diminished. The arched form of the connection carries it above the tops of growing corn in passing over the same.

Two short standards, H H, Figs. 1 and 2, are secured upon the central cross-beam, S, of the frame and furnish bearings for the journal ends of a stout adjusting-roller, K, fixed between them across the machine, over the axle, as clearly shown in Figs. 2 and 3. Upon this roller are hooked two chains of equal length, which support the plow beams and shares at the proper height. These chains are lengthened or shortened by winding or unwinding them upon the roller, and the roller may be controlled by a ratchet and pawl, or by a bar so inserted through holes pierced through the shaft of the roller as to project out and strike against the cross-piece below it. The lower ends of these supporting-chains are attached to the treadles M M (see Figs. 1, 2, and 3) about midway of their length, and these treadles are pivoted at one end to the outer side of the main plow-beams, just in front of the point of attachment of the secondary divergent beams E E, and they extend back along the main beam and under said secondary beams, so as to project back beyond the rear ends of the main beams. Hence the chains in the center of the treadles not only sustain the weight of the plows and plow-beams, thus supporting them at any given height, but they also form a central fulcrum to the treadles M M, so that by pressing heavily upon the outer free ends of the treadles the pivoted ends may be thrown up, lifting with them the main plow-beams D D, with all their attachments, and carrying them up against the under side of the axle. The driver, sitting upon his seat at C, with his feet upon these treadles, may thus at any time raise the plow entirely off the ground and out of reach of all ordinary obstructions by throwing his weight upon the treadles.

Suitable guards or fenders, P P, may be attached to the plow-beams by arms Q Q, as clearly shown in the drawings, for the purpose of preventing the clods of earth turned up by the plowshares from falling upon and injuring the very young plants when such are under cultivation.

The draft-pole R is pivoted at $q$ to the transverse beam B, (see Figs. 3 and 4,) and passes backward from that point to the central cross-beam, S, whose front face has the form of the arc of a circle formed about a center coincident with the pivot-pin $q$. At short intervals along the face of this arc are formed a number of cavities or sockets, $m$ $m$. A spring-bolt, $l$, secured to the draft-pole, shoots into the sockets $m$ $m$, so as to retain the draft-pole in any position to which it may be horizontally adjusted.

Four pulley-blocks, T T T T, are fastened to the main side beams, A A. A cord, $p$, passes through these blocks and around pulleys $o$ $o$ $o$ $o$, its ends being attached to one arm of the angular lever W, which is pivoted to the draft-pole R. Links $r$ $r$ connect the remaining two arms of the angular lever to the end of the spring-bolt $l$. By means of this arrangement of cord, pulleys, and angular lever the driver is enabled from his seat on the rear of the machine to govern the direction of the draft-pole, for by drawing the cord $p$ to right or left, either with his hand or foot, he causes the angular lever W to turn upon its pivot $s$, retracting the spring-bolt $l$ from the socket in which its end rests, and leaves the pole free to obey the tension of the cord. Upon being relieved from this tension the bolt immediately springs into the nearest adjacent socket, and retains the pole in its new position until another change is deemed necessary.

My improved cultivator is extremely simple in its operation. The depth to which the furrows are to be run having been determined, the plows are vertically adjusted by turning the roller K and winding or unwinding the chains L L, to which the plow-beams are suspended, so as to shorten or lengthen them, as the occasion requires. The roller is then locked in its proper position by means of the rod $l$, passing through it and bearing against the cross-beam S, or by any other suitable device. The driver, seated upon the platform C, may rest his feet upon the plow-beams E E, thereby keeping the plows well down to their work and enabling him to guide them, so as to accommodate their direction to any irregularities in the rows of corn, while by bearing upon the treadles M M he can readily throw the plows out of the ground in order to overcome obstructions or to turn the machine around.

In operating upon the side of a slope the tendency of all cultivators is to slide downhill, thereby causing the plows to drag diagonally through the earth, rendering it necessary to crowd the animals up onto the higher rows of corn in order to counteract this tendency. This defect is obviated in my cultivator by the improvements herein described in the horizontal adjustment of the pole, for by pointing the pole slightly uphill when operating upon hilly ground and fixing it in the proper position the necessary direct course of the machine can be maintained without changing the course of the horses. This arrangement also facilitates the working of the machine in fence-corners and other contracted spaces.

I am well aware that cultivators have heretofore been constructed in which treadles are employed for the purpose of raising the cultivator points or plows from the ground and the plow-beams suspended from vertically-adjustable levers; but in all these machines the treadles are pivoted to the inside of the plow-beams, so as to be liable to come into violent contact with the guard-boards or fenders (when such are employed) and to require a direct attachment of the plow-beams to the adjustable levers, so that the upward movement of the plows is very limited and comparatively difficult to accomplish. I have sought to improve upon these existing machines by placing the treadles on the outside of the main plow-beams, so as that they will bear against the ends of the uprights N N or the under side of the secondary plow-beams E E, as I have herein described. I am thereby enabled to suspend the plow-beams, treadles, guards, &c., all by the two chains L L alone, greatly simplifying the construction of the machine, increasing the range of motion of the plow-shares governed by the treadles, as well as largely adding to the power of the treadles, and consequently lessening the labors of the operator.

Having thus fully described my invention, what I claim therein as new, and desire to secure by Letters Patent, is—

1. The treadle-levers M M, the adjustable roller K, and the chains or cords L L, when so combined with each other and with the frame of a cultivator-plow as to sustain the weight of the plows and plow-beams and enable them to be quickly and readily elevated from the ground by the driver, substantially in the manner and for the purpose herein set forth.

2. The cord $p$, pulleys $o\ o\ o\ o$, angular lever W, spring-bolt $l$, arc-shaped cross-beam S, and sockets $m\ m$, when combined with each other and with the frame of a cultivator-plow for the purpose of enabling me to adjust the direction of the draft, substantially in the manner herein set forth.

The foregoing specification of my improved corn-plow or cultivator signed this 11th day of May, A. D. 1864.

J. J. RIDER.

In presence of—
  E. E. BACON,
  SAML. STROHM.